United States Patent
Konno

(10) Patent No.: US 10,737,619 B2
(45) Date of Patent: Aug. 11, 2020

(54) VEHICLE-MOUNTED MOVING IMAGE TRANSMITTING DEVICE, VEHICLE-MOUNTED MOVING IMAGE DISPLAY DEVICE, AND VEHICLE-MOUNTED MOVING IMAGE COMMUNICATION SYSTEM

(71) Applicant: DENSO CORPORATION, Kariya, Aichi-pref. (JP)

(72) Inventor: Hiroki Konno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/064,476

(22) PCT Filed: Nov. 17, 2016

(86) PCT No.: PCT/JP2016/084091
§ 371 (c)(1),
(2) Date: Jun. 21, 2018

(87) PCT Pub. No.: WO2017/110324
PCT Pub. Date: Jun. 29, 2017

(65) Prior Publication Data
US 2018/0370435 A1 Dec. 27, 2018

(30) Foreign Application Priority Data
Dec. 24, 2015 (JP) .................... 2015-252137

(51) Int. Cl.
*B60R 1/00* (2006.01)
*H04N 7/18* (2006.01)
(Continued)

(52) U.S. Cl.
CPC ............... *B60R 1/00* (2013.01); *B60R 11/04* (2013.01); *B60W 50/14* (2013.01); *H04N 7/18* (2013.01);
(Continued)

(58) Field of Classification Search
None
See application file for complete search history.

(56) References Cited

U.S. PATENT DOCUMENTS

| | | | |
|---|---|---|---|
| 2003/0220123 A1 | 11/2003 | Motohashi | |
| 2012/0218412 A1* | 8/2012 | Dellantoni | G01C 21/3602 348/148 |
| 2016/0044558 A1* | 2/2016 | Fukada | G09G 5/00 455/509 |

FOREIGN PATENT DOCUMENTS

| | | |
|---|---|---|
| JP | 2000244947 A | 9/2000 |
| JP | 2001285841 A | 10/2001 |

(Continued)

OTHER PUBLICATIONS

Darsain, "FPSMETER", http://darsa.in/fpsmeter/#1documentation, Dec. 18, 2014 (Year: 2014).*

(Continued)

*Primary Examiner* — Stuart D Bennett
(74) *Attorney, Agent, or Firm* — Harness, Dickey & Pierce, P.L.C.

(57) ABSTRACT

A vehicle-mounted moving image transmitting device includes: a camera outputting a video signal corresponding to a video of a subject existing outside a vehicle; a signal processor superimposing animation images on multiple frames, which form a moving image corresponding to the video signal outputted from the camera, frame by frame, while changing the animation images in synchronization (Continued)

with frame advancement; and a wireless communication interface wirelessly transmitting the moving image formed of the multiple frames, which are superimposed with the animation images by the signal processor, at a predetermined frame rate to a moving image display device. The moving image display device receives the moving image and displays the received moving image to an occupant of the vehicle.

20 Claims, 8 Drawing Sheets

(51) Int. Cl.
*H04N 21/414* (2011.01)
*H04N 21/4223* (2011.01)
*H04N 21/4363* (2011.01)
*H04N 21/81* (2011.01)
*H04N 21/431* (2011.01)
*H04N 21/43* (2011.01)
*B60R 11/04* (2006.01)
*B60W 50/14* (2020.01)

(52) U.S. Cl.
CPC ... *H04N 21/41422* (2013.01); *H04N 21/4223* (2013.01); *H04N 21/4307* (2013.01); *H04N 21/4316* (2013.01); *H04N 21/43637* (2013.01); *H04N 21/8146* (2013.01); *B60R 2300/30* (2013.01); *B60R 2300/304* (2013.01); *B60R 2300/406* (2013.01); *B60R 2300/70* (2013.01); *B60R 2300/802* (2013.01); *B60W 2050/146* (2013.01)

(56) References Cited

FOREIGN PATENT DOCUMENTS

| JP | 2003188801 A | 7/2003 |
|---|---|---|
| JP | 2008206042 A | 9/2008 |
| JP | 2013090152 A | 5/2013 |
| JP | 2014183440 A | 9/2014 |

OTHER PUBLICATIONS

"Clarion released digital radio camera system for tracks", LogisticsToday, Mar. 26, 2014.

* cited by examiner

FRAME RATE IS DECREASING

VEHICLE-MOUNTED MOVING IMAGE TRANSMITTING DEVICE, VEHICLE-MOUNTED MOVING IMAGE DISPLAY DEVICE, AND VEHICLE-MOUNTED MOVING IMAGE COMMUNICATION SYSTEM

CROSS REFERENCE TO RELATED APPLICATIONS

This application is a U.S. National Phase Application under 35 U.S.C. 371 of International Application No. PCT/JP2016/084091 filed on Nov. 17, 2016 and published in Japanese as WO 2017/110324 A1 on Jun. 29, 2017. This application is based on and claims the benefit of priority from Japanese Patent Application No. 2015-252137 filed on Dec. 24, 2015. The entire disclosures of all of the above applications are incorporated herein by reference.

TECHNICAL FIELD

The present disclosure relates to a vehicle-mounted moving image transmitting device, a vehicle-mounted moving image receiving device, and a vehicle-mounted moving image communication system.

BACKGROUND ART

A vehicle-mounted moving image communication system in the related art is described in, for example, Patent Literature 1. The moving image communication system includes a moving image transmitting device wirelessly transmitting a moving image indicating an outside view of the vehicle at a predetermined frame rate, and a moving image receiving device receiving the moving image transmitted from the moving image transmitting device and displaying the received moving image to an occupant in the vehicle.

PRIOR ART LITERATURE

Patent Literature

Patent Literature 1: JP 2013-090152 A

SUMMARY OF INVENTION

In the moving image communication system, when a real view within an imaging range of the moving image transmitting device remains unchanged over a certain period, display contents of respective frames forming the moving image during the certain period displayed to the occupant remains unchanged, too.

Even when a real view within the imaging range of the moving image transmitting device is changing over the certain period, the moving image may include only one frame corresponding to the video during the certain period depending on a frame rate at which the moving image is transmitted.

In such a case, the occupant cannot determine whether a view within the imaging range outside the vehicle is not changing really or a view outside the vehicle is actually changing but a frame rate of the moving image is so low that only a same frame is displayed during the certain period. Hence, the occupant has no idea how exactly the occupant understands a situation outside the vehicle by looking at a video based on the moving image.

In view of the foregoing difficulties, it is an object of the present disclosure to provide a moving image communication system which includes a moving image transmitting device wirelessly transmitting a moving image based on a video outside a vehicle, and a moving image receiving device receiving the moving image and displaying the moving image to an occupant, and enables an occupant to know a reliability level of the displayed moving image.

According to an aspect of the present disclosure, a vehicle-mounted moving image transmitting device includes: a camera outputting a video signal corresponding to a video of a subject existing outside a vehicle; a signal processing portion superimposing animation images on a plurality of frames frame by frame while changing the animation images in synchronization with a frame advancement, and the plurality of frames forming a moving image corresponding to the video signal outputted from the camera; and a wireless module wirelessly transmitting, to a moving image receiving device at a frame rate that is preliminarily determined, the moving image which is formed of the plurality of frames superimposed with the animation images by the signal processing portion, and the moving image receiving device receiving the moving image and displaying the moving image that is received to an occupant of the vehicle.

According to another aspect of the present disclosure, a vehicle-mounted moving image receiving device includes: a wireless module receiving a moving image corresponding to a video of a subject existing outside a vehicle, and the moving image being wirelessly transmitted from a moving image transmitting device at a frame rate that is preliminarily determined; a display unit displaying a video to an occupant of the vehicle; and a signal processing portion controlling the display unit to display the video corresponding to the moving image received at the wireless module, wherein the signal processing portion superimposes animation images on a plurality of frames forming the moving image frame by frame while changing the animation images in synchronization with a frame advancement and outputs the plurality of frames superimposed with the animation images to the display unit.

According to another aspect of the present disclosure, a moving image communication system includes: a vehicle-mounted moving image transmitting device, superimposing animation images on a plurality of frames, which form a moving image corresponding to a video of a subject existing outside a vehicle, frame by frame while changing the animation images in synchronization with a frame advancement, and the vehicle-mounted moving image transmitting device wirelessly transmitting the plurality of frames superimposed with the animation images at a predetermined frame rate; and a vehicle-mounted moving image receiving device receiving the moving image transmitted from the moving image transmitting device, and displaying a video corresponding to the moving image that is received to an occupant of the vehicle.

According to another aspect of the present disclosure, a moving image communication system includes: a vehicle-mounted moving image transmitting device wirelessly transmitting a moving image corresponding to a video of a subject existing outside a vehicle at a predetermined frame rate; and a vehicle-mounted moving image receiving device receiving the moving image transmitted from the moving image transmitting device, wherein the vehicle-mounted moving image receiving device superimpose animation images on a plurality of frames forming the moving image frame by frame while changing the animation images in synchronization with a frame advancement, and displays a video corresponding to the moving image formed of the plurality of frames superimposed with the animation images to an occupant of the vehicle.

By superimposing animation images on multiple frames forming a moving image frame by frame while changing the animation images in synchronization with frame advancement as above, the occupant can determine whether frames are advancing depending on whether animation images on a displayed video are changing. The occupant can thus know a reliability level of the displayed video.

EMBODIMENTS FOR CARRYING OUT INVENTION

First Embodiment

Figure 1:
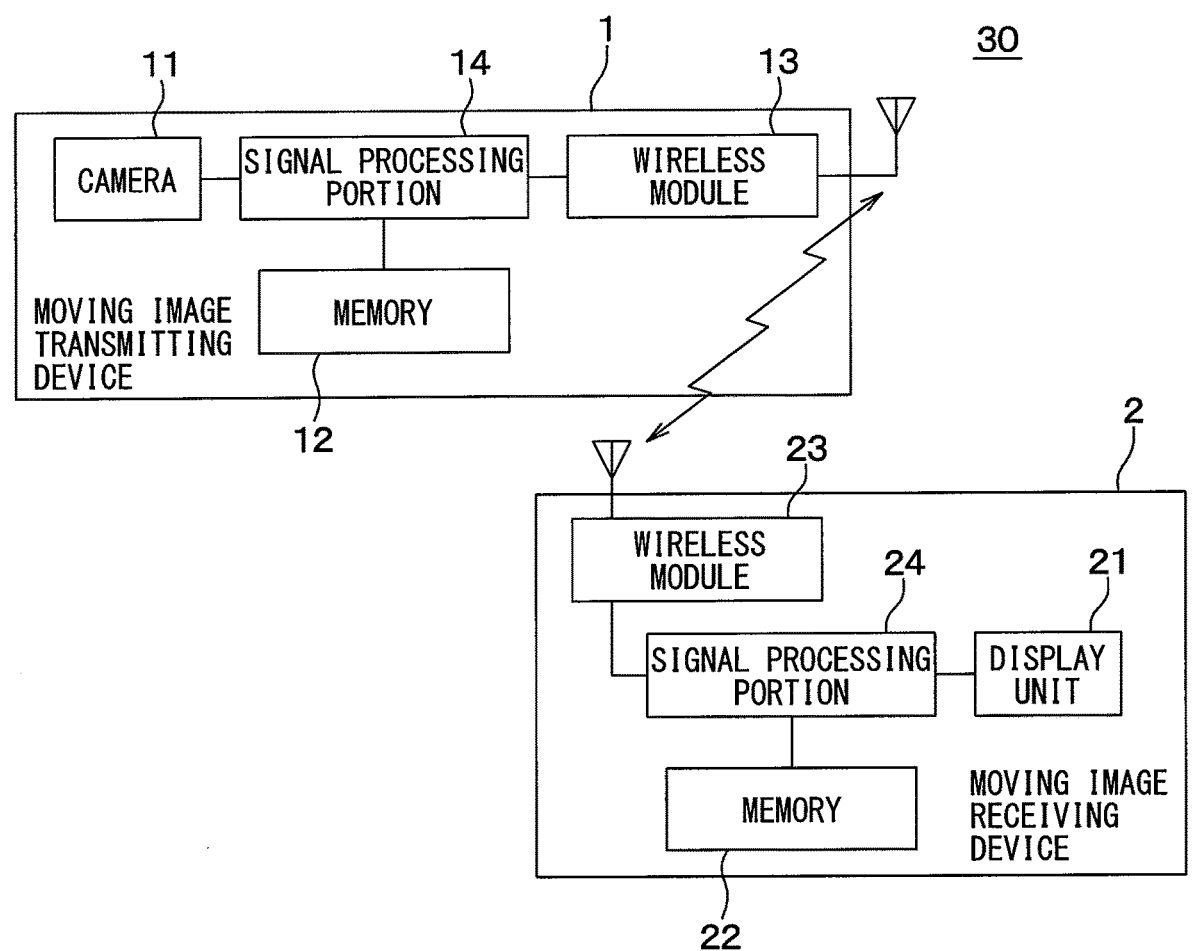
FIG. 1 is a view showing a configuration of a moving image communication system according to a first embodiment.

Hereinafter, a first embodiment will be described. A moving image communication system 30 of the present embodiment is mounted in a vehicle and, as is shown in FIG. 1, includes a moving image transmitting device 1 and a moving image receiving device 2. The moving image receiving device 2 may also be referred to as a moving image display device 2. The vehicle where the moving image communication system 30 is mounted may be either a personal vehicle or a business vehicle, such as a bus or a truck. The moving image transmitting device 1 is provided, for example, near a rear end of the vehicle, and the moving image receiving device 2 is provided near a driver's seat (for example, a dashboard) of the vehicle.

The moving image transmitting device 1 includes a camera 11, a memory 12, a wireless module 13, and a signal processing portion 14. The wireless module 13 may also be referred to as a wireless communication interface and the signal processing portion 14 may also be referred to as a signal processor 14.

The camera 11 has an optical system including a lens and so on, and a solid-state imaging device (for example, a CCD imaging sensor or a CMOS imaging sensor). The optical system focuses a video of a subject within a predetermined imaging range outside the vehicle on the solid-state imaging device, and the solid-state imaging device outputs a video signal corresponding to the video. The video signal is either a digital video signal or an analog video signal. The memory 12 is a storage medium used by the signal processing portion 14 for image processing. The memory 12 is a non-transitory tangible recording medium.

The wireless module 13 is a wireless communication interface to make communication with the moving image receiving device 2. In the present embodiment, the wireless module 13 makes communication in compliance with the IEEE802.11a/b/g/j/n/ac/ad standards for wireless LAN or in compliance with standards partly changed from the IEEE802.11a/b/g/j/n/ac/ad standards. However, communication standards other than communication standards for wireless LAN may be used as another example. As will be described below, the wireless module 13 wirelessly transmits a moving image according to a video signal outputted from the signal processing portion 14 to the moving image receiving device 2.

The signal processing portion 14 includes a CPU, a RAM, a ROM, and so on. Any process performed by the signal processing portion 14 described below is realized by the CPU by running a predetermined program read out from the ROM and using the RAM and the memory 12 as a work area during an execution of the program.

The moving image display device 2 has a display unit 21, a memory 22, a wireless module 23, and a signal processing portion 24. The wireless module 23 may also be referred to as the wireless communication interface 23 and the signal processing portion 24 may also be referred to as the signal processor 24. The display unit is a device displaying a video to a driver of the vehicle. The memory 22 is a storage medium used by the signal processor 24 for image processing. The memory 22 is a non-transitory tangible recording medium.

The wireless module 23 is a wireless communication interface to make communication with the moving image transmitting device 1. In the present embodiment, the wireless module 23 makes communication in compliance with same communication standards adopted by the wireless module 13.

The signal processing portion 24 includes a CPU, a RAM, a ROM, and so on. Any process performed by the signal processing portion 24 described below is realized by the CPU by running a predetermined program read out from the ROM and using the RAM and the memory 12 as a work area during an execution of the program.

The following will describe an operation of the moving image communication system 30 configured as above. The signal processing portion 14 in the moving image transmitting device 1 performs process depicted in FIG. 2, and the signal processing portion 24 in the moving image receiving device 2 performs process depicted in FIG. 3.

The signal processing portion 14 and the signal processing portion 24 first negotiate with each other in a known manner in compliance with the standards for wireless LAN. More specifically, the signal processing portion 14 negotiates with the signal processing portion 24 in Step 110 of FIG. 2 while the signal processing portion 24 negotiates with the signal processing portion 14 in Step 210 of FIG. 3.

Through the negotiation, the signal processing portions 14 and 24 identify congestion degrees of respective channels by detecting a beacon emitted from any other wireless communication device than the moving image transmitting device 1 and the moving image receiving device 2. The signal processing portions 14 and 24 determine a common channel to be used therebetween according to the identified congestion degrees. A congestion degree is a quantity susceptible to an external disturbance. A data transfer rate is determined according to a congestion degree of the determined channel, and a lower determined data transfer rate is determined for a higher congestion degree. After the negotiation, the signal processing portions 14 and 24 make communication with each other via the channel at the data transfer rate determined by the negotiation.

In subsequent Step 220, the signal processing portion 24 determines a frame rate R and a compression method of a moving image for a moving image so that the moving image is transmitted from the moving image transmitting device 1 at the data transfer rate determined in Step 210 without missing any frame. More specifically, a higher frame rate is adopted as the data transfer rate increases, and a compression method with a higher compression ratio is adopted as the data transfer rate decreases. A frame rate is determined from multiple levels (for example, three or more levels) between a maximum frame rate (that is, 30 fps) and a minimum frame rate (that is 0 fps). Also in Step 220, the frame rate R and the compression method thus determined are notified to the moving image transmitting device 1 by transmitting information on the determined frame rate R and the determined compression method to the moving image transmitting device 1 via the wireless module 23.

Meanwhile, at an end of the moving image transmitting device 1, the signal processing portion 14 proceeds from Step 110 to Step 120 and receives the information on the frame rate R and the compression method transmitted from the moving image receiving device 2 in the above-described manner via the wireless module 13. The frame rate R and the compression method thus received are set as a frame rate and a compression method to be used. As will be described below, the signal processing portion 14 transmits a moving image to the moving image receiving device 2 by using the frame rate R and the compression method received in Step 120.

Figure 4:
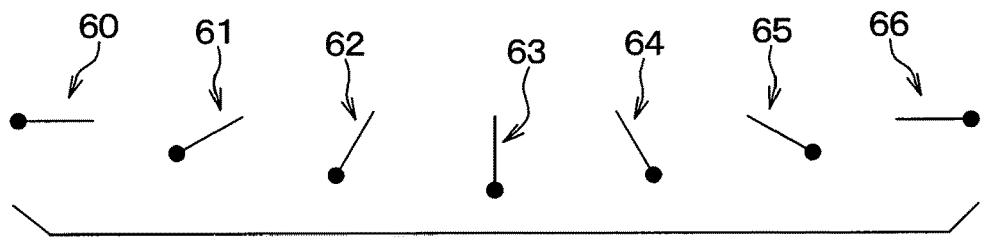
FIG. 4 is a view showing a group of animation images.

The signal processing portion 14 proceeds from Step 120 to Step 125 and selects one animation image. The selected animation image is one of a group of multiple animation images 60 through 66 shown in FIG. 4. As will be described below, the animation images 60 through 66 in the group are displayed one after another in reciprocating order like a swing of a pendulum. That is, the animation images 60 through 66 may be displayed repeatedly in order of images 60, 61, 62, 63, 64, 65, 66, 65, 64, 63, 62, 61.

Hence, the signal processing portion 14 selects the animation image 61 in initial Step 125 performed first time after communication with the moving image receiving device 2 starts. In Step 125 performed second and subsequent times after communication with the moving image receiving device 2 starts, the signal processing portion 14 selects an animation image following an animation image selected in last Step 125 according to the display order of the animation images specified above.

Subsequently, the signal processing portion 14 fetches one frame in Step 130 according to a video signal outputted from the camera 11. The frame is image data representing a landscape within the imaging range of the camera 11 when the frame is fetched.

Figure 5:
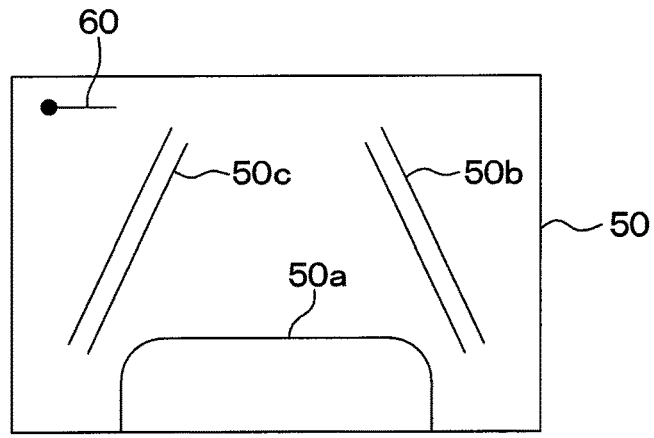
FIG. 5 is a view of a frame superimposed with an animation image.

In subsequent Step 140, the animation image selected in latest Step 125 is superimposed on the frame fetched in preceding Step 130. More specifically, as is shown in FIG. 5, the selected animation image is superimposed at an upper left corner of a frame 50. For example, in a region at the upper left corner accounting for up to one fiftieth of all pixels forming the frame 50, the selected animation image is superimposed. In an example of FIG. 5, the animation image 60 is superimposed on the frame 50. The animation image is superimposed at the upper left corner so as not to overlap an object displayed in the frame 50 (for example, a rear end 50a of the vehicle and white lines 50b and 50c on a road).

In subsequent Step 150, the signal processing unit 14 compresses (that is, encodes) the frame superimposed with the animation image in preceding Step 140 by the compression method set in latest Step 120 and transmits the compressed frame to the moving image receiving device 2 via the wireless module 13.

In subsequent Step 160, the signal processing portion 14 determines whether a next frame transmission time arrives. The next frame transmission time comes after an elapse of a frame interval, which is a reciprocal number of the frame rate set in latest Step 120, from a time point when the frame is fetched in latest Step 130. When a determination is made that the next frame transmission time arrives, the signal processing portion 14 returns to Step 125. Otherwise, when a determination is made that the next frame transmission time has not arrived yet, the signal processing portion 14 proceeds to Step 170.

In Step 170, the signal processing portion 14 determines whether a negotiation time arrives. Whether the negotiation time arrives is determined by, for example, determining whether a predetermined wait time has elapsed after the previous negotiation is completed in latest Step 110. The wait time is longer than two times of the above-described frame interval. The wait time may also be longer than 30 times of the above-described frame interval. When a determination is made that the negotiation time has not arrived yet, the signal processing portion 14 returns to Step 160. Otherwise, when a determination is made that the next frame transmission time has arrived, the signal processing portion 14 returns to Step 110.

In the manner as above, the signal processing portion 14 repeats Steps 160 and 170 unless either the next frame transmission time or the negotiation time arrives. When the next frame transmission time arrives first, the signal processing portion 14 returns to Step 125 and selects the animation image in the following order. When the negotiation time arrives first, the signal processing portion 14 returns to Step 110 and makes a negotiation again.

Accordingly, the signal processing portion 14 in the moving image transmitting device 1 controls the wireless module 13 to transmit frames one by one in time-series order at the pre-set frame rate by performing Steps 125, 130, 140 and 150 each time the frame transmission time comes until the negotiation time comes. All of multiple frames transmitted in the manner as above correspond to one moving image according to a video signal outputted from the camera 11.

The signal processing portion 14 changes animation images in order in synchronization with frame advancement, that is, each time frames advance by one in Step 125, and superimposes the animation images on multiple frames forming the to-be-transmitted moving image frame by frame in Step 140. The wireless module 13 transmits the moving image formed of the frames superimposed with the animation images to the moving image receiving device 2.

Meanwhile, at an end of the moving image receiving device 2, the signal processing portion 24 proceeds from Step 220 to Step 230 and receives one frame and decompresses the received frame. More specifically, the signal processing portion 24 waits until one of the frames transmitted from the moving image transmitting device 1 in the manner as above is completely received via the wireless module 23. Upon receipt of one frame, the signal processing portion 24 decompresses (that is, decodes) the received frame by a method corresponding to the compression method determined in preceding Step 220 and immediately proceeds to Step 240.

In Step 240, whether the frame rate R determined in latest Step 220 is below a preliminarily determined notification threshold Rn. The threshold Rn is set to, for example, 15 fps. When the frame rate R is below the notification threshold Rn, the signal processing portion 24 proceeds to Step 250. Otherwise, when the frame rate R is not below the notification threshold Rn, the signal processing portion 24 jumps to Step 280 by skipping Steps 250, 260 and 270.

Figure 6:
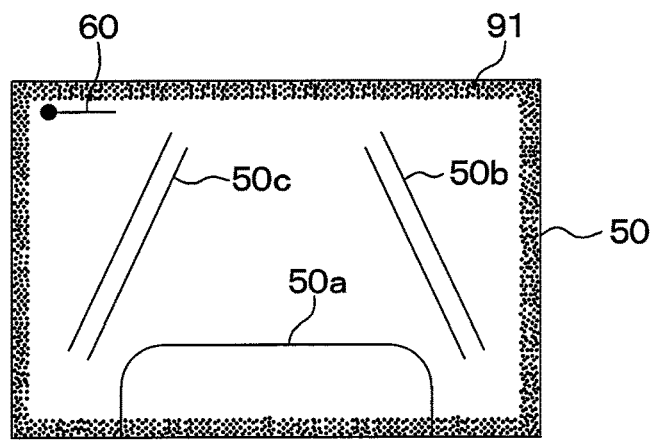
FIG. 6 is a view of the frame superimposed also with a color border image.

In Step 250, the signal processing portion 24 superimposes a color border image on the frame received in latest Step 230. The color border image corresponds to a notification image. More specifically, as is shown in FIG. 6, a color border image 91 of a frame shape in a particular color (for example, easily-noticeable red, purple, or orange) is superimposed all along a peripheral border of the frame 50. The peripheral border may be a portion accounting for up to one fifth of all pixels forming the frame 50. The color border image 91 is superimposed along the peripheral border so as not to overlap with an object displayed in the frame 50 (for example, the rear end 50a of the vehicle and the white lines 50b and 50c on the road). The signal processing portion 24 proceeds to Step 260 from Step 250.

In Step 260, a determination is made as to whether a period during which the frame rate R determined in latest Step 230 remains below a warning threshold Rw (that is, a duration of R<Rw) exceeds a reference period T1. The warning threshold Rw is a value smaller than the notification threshold Rn and set to, for example, 5 fps. The reference period T1 is a preliminarily set time length and set to, for example, 5 seconds. The duration of R<Rw does not exceed the reference period T1 in a case where R≥Rw or where a state of R<Rw is continuing but the duration has not exceeded the reference period T1.

When it is determined that the duration of R<Rw does not exceed the reference period T1, the signal processing portion 24 jumps to Step 280 by skipping Step 270. When it is determined that the duration of R<Rw exceeds the reference period T1, the signal processing portion 24 proceeds to Step 270.

Figure 7:
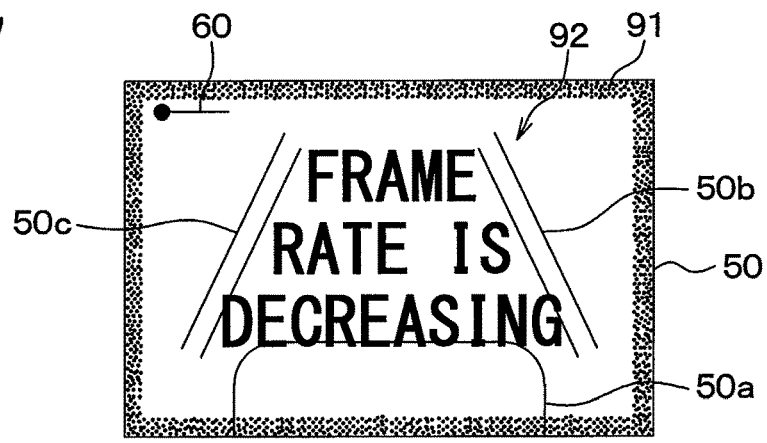
FIG. 7 is a view of the frame superimposed further with a warning image.

In Step 270, the signal processing portion 24 superimposes a warning image 92 on the frame received in latest Step 230. Because the signal processing portion 24 has already performed Step 250, the color border image 91 is already superimposed on the frame on which the warning image 92 is to be superimposed. The warning image 92 adopts a text informing a low frame rate or an image making an entire screen displayed on the display unit 21 light-transmitting or non-light-transmitting blue. For example, a thick text "FRAME RATE IS DECREASING" as is shown in FIG. 7 is adopted as a text.

The warning image 92 accounts for a larger proportion of pixels forming the entire frame than the color border image 91. A display range of the warning image 92 at least in part is closer to a center of the screen on the display unit 21 than a display range of the color border image 91. Hence, a subject in the imaging range of the camera 11 becomes less easy to see for the driver by superimposing the warning image 92 on the frame than by superimposing the color border image 91 on the frame.

Also, the warning image 92 accounts for a far larger proportion of the pixels forming the entire frame than each of the animation images 61 through 69. Hence, when the warning image 92 is superimposed on the frame, a portion corresponding to a video outside the vehicle in the frame becomes difficult to see. The signal processing portion 24 proceeds to Step 280 from Step 270.

In Step 280, the signal processing portion 24 outputs the frame received in latest Step 230 to the display unit 21. The display unit 21 thus displays a video based on the moving image to the driver. In a case where the image processing portion 24 proceeds from latest Step 240 to Step 250, a frame outputted to the display unit 21 is superimposed with the color border image 91. In a case where the image processing portion 24 proceeds from latest Step 260 to Step 270, a frame outputted to the display unit 21 is superimposed further with the warning image 92 (that is, an attention-calling image). In a case where the signal processing portion 24 jumps from Step 240 to Step 280 by skipping Steps 250, 260, and 270, a frame outputted to the display unit 21 is superimposed with neither the color border image 91 nor the warning image 92. In a case where the signal processing portion 24 jumps from latest Step 260 to Step 280 by skipping Step 270, a frame outputted to the display unit 21 is not superimposed with the warning image 92.

The signal processing portion 24 proceeds from Step 280 to Step 290 and determines whether a negotiation time has arrived. Whether the negotiation time has arrived or not is determined by, for example, determining whether a wait time has elapsed after the negotiation is completed in latest Step 210. The wait time is set to a value same as the value of the wait time used by the signal processing portion 14 in the moving image transmitting device 1 in Step 170 of FIG. 2. When a determination is made that the negotiation time has not arrived, the signal processing portion 24 returns to Step 230. When it is determined that the negotiation time has arrived, the signal processing portion 24 returns to Step 210.

In the manner as above, the signal processing portion 24 performs Steps 230, 240, and 280 each time a frame is received from the moving image transmitting device 1 until the negotiation time comes. However, when it is determined that R<Rn, the signal processing portion 24 also performs Steps 250 and 260. Further, when it is determined that the duration of R<Rw exceeds the reference period T1 (the duration while R is smaller than Rw>T1), the signal processing portion 24 also performs Step 270. By repeating the process as above, the signal processing portion 24 receives the moving image transmitted from the moving image transmitting device 1, and controls the display unit 21 to display the received moving image at the frame rate R.

The following will describe a case where the negotiation time comes. When the negotiation time comes, the signal processing portion 14 in the moving image transmitting device 1 makes a negotiation again in Step 110 in the manner as described above and resets the frame rate R and the compression method in Step 120 in the manner as described above. After Step 120, the signal processing portion 14 transmits a moving image at the frame rate R and the compression method reset most recently.

Meanwhile, when the negotiation time comes, the signal processing portion 24 in the moving image receiving device 2 makes a negotiation again in Step 210 in the manner as described above. The signal processing portion 24 further determines new frame rate R and compression method in Step 220 in the manner as described above and directs the frame rate R and the compression method thus determined to the moving image transmitting device 1. After Step 220, the signal processing portion 24 receives a moving image transmitted at the frame rate R and the compression method reset most recently and controls the display unit 21 to display the received moving image.

The negotiation time comes after an elapse of predetermined duration from the last negotiation time. Hence, a communication environment of the moving image transmitting device 1 and the moving image receiving device 2 may be changed or remain unchanged.

When the communication environment remains unchanged, a channel and a data transfer rate same as the channel and the data transfer rate used last time are determined in the negotiation made in Step 110. In such a case, a frame rate R and a compression method same as the frame rate R and the compression method used last time are set in Step 120.

In a case where the communication environment has changed, a channel and a data transfer rate different from the channel and the data transfer rate used last time may be determined in the negotiation made in Step 110. Also, a frame rate R and a compression method different from the frame rate R and the compression method used last time may be set in Step 120. Hence, the signal processing portion 14 in the moving image transmitting device 1 may change a frame rate case by case.

An effect achieved by changing the animation images in synchronization with frame advancement as described above is particularly noticeable when the occupant is not aware of a present frame rate, such as a case where the frame rate is changed when the negotiation is made again. The following will describe such a point.

A product of a vehicle-mounted moving image communication system wirelessly transmitting and receiving a moving image according to a video signal outputted from a camera is already commercially available and such a product has achieved a delay amount of less than 100 ms in displaying a moving image by communication. An example of such a product is a system formed of CC-3500 and EE-2178 of Clarion Co., Ltd.

When communication is interfered with by congestion and a disturbance while a moving image is wirelessly transmitted and received with a small delay amount, the signal processing portions 14 and 24 decrease a data transfer rate by negotiation and decrease a frame rate as a result to prevent missing in communication.

When the frame rate decreases, a video displayed to the occupant becomes unsmooth. Hence, the occupant using the existing product quite frequently sees a phenomenon that a video displayed to the occupant remains unchanged no matter whether a real view in the imaging range of the moving image transmitting device over a certain period is changing or remains unchanged. In such a case, the occupant cannot determine whether a view within the imaging range outside the vehicle is not changing really or the view outside the vehicle is actually changing but the frame rate of the moving image is so low that only the same frame is displayed during the certain period. Hence, the occupant has no idea how exactly the occupant understands a situation outside the vehicle by looking at a video based on the moving image.

It should be noted in the present embodiment that, as has been described above, the animation images are changed and superimposed on the frames frame by frame, respectively, in Steps 125 and 140 in synchronization with frame advancement. Hence, whether the frames are advancing can be determined depending on whether the animation images 61 through 65 are changing on the display unit 21 in a case as is shown in an upper row of FIG. 8 where the frame rate R is 30 fps and even in a case as is shown in a lower row of FIG. 8 where the frame rate R decreases from 30 fps to 10 fps.

Figure 8:
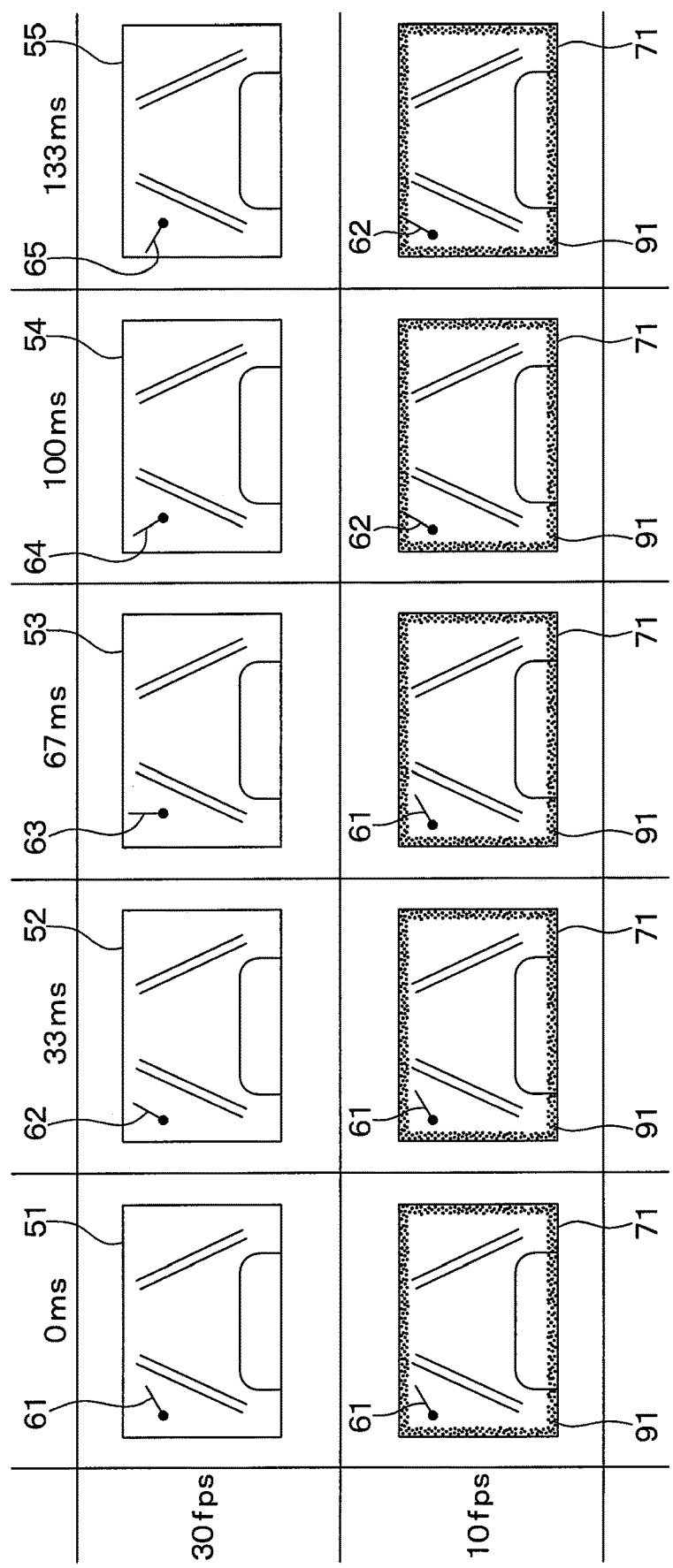
FIG. 8 is a view showing temporal changes of videos displayed on a display unit at different frame rates.

More specifically, FIG. 8 shows videos displayed on the display unit 21 at each time point after elapses of 0 ms, 33 ms, 67 ms, 100 ms, and 133 ms from a certain time point when the frame rate R is 30 fps and when the frame rate R is 10 fps.

When the frame rate R is 30 fps, frames advance only once in about every 33 ms. Hence, a video of one frame advanced from the last frame is displayed on the display unit 21 at each time point of FIG. 8. Hence, the animation images 61 through 65 are changing one by one with an elapse of time at the respective time points. Accordingly, as is shown in FIG. 8, even when a real view within the imaging range of the camera 11 remains unchanged over a period from 0 ms to 133 ms, the driver can know that the frames are advancing because the animation images 61 through 65 are changing. That is, the driver can know that the driver understands a situation outside the vehicle quite exactly by looking at a video based on the moving image.

In comparison, when the frame rate R is 10 fps, frames advance only once in every 100 ms. Hence, videos displayed on the display unit 21 at 0 ms, 33 ms, and 67 ms of respective time points of FIG. 8 are totally alike. Naturally, the animation image 61 at 0 ms, 33 ms, and 67 ms remains unchanged. One frame advances at 100 ms. However, videos displayed on the display unit 21 at 100 ms and 133 ms are totally alike. Hence, the driver can know that the frames are not advancing, that is, the frame rate is decreasing in a period after 0 ms and before 100 ms. The driver can thus pay more attention with an awareness that a display on the display unit 21 is less reliable than normal. That is, the driver can know that the driver understands a situation outside the vehicle less exactly than normal by looking at a video based on the moving image. Such knowledge is particularly effective in a circumstance where an object enters the imaging range while the frames are not advancing (for example, a period from 0 ms to immediately before 100 ms and a period from 100 ms to immediately before 200 ms), because the driver with such knowledge can take precautions against an object that might have entered within the imaging range and can therefore behave cautiously without overtrusting the display unit 21 during such periods.

In one of the examples of FIG. 8 where the frame rate R is 10 fps, the signal processing portion 24 determines that the frame rate R is below the notification threshold Rn in Step 240 and superimposes the color border image 91 on the frame in Step 250. Also, the signal processing portion 24 determines that the frame rate R is above the warning threshold Rw but the duration of R<Rw does not exceed the reference period T1 in Step 260 and skips Step 270. Accordingly, the warning image 92 is not superimposed on the frame and only the animation image and the color border image 91 are superimposed on the frame in such a case.

In the example of FIG. 8 where the frame rate R is 10 fps, even when the warning threshold Rw is set higher than 10 fps (for example 12 fps), the signal processing portion 24 skips Step 270 when the duration of R<Rw is shorter than the reference period T1. Accordingly, the warning image 92 is not superimposed on the frame and only one of the animation images 61 through 65 and the color border image 91 are superimposed on the frame. Owing to the configuration as above, when the frame rate R drops below the warning threshold Rw, the driver can know that the frame rate is decreasing from the animation images 61 through 65 and the color border image 91 even during a time delay before the warning image 92 is displayed.

In the other one of the examples of FIG. 8 where the frame rate R is 30 fps, the signal processing portion 24 determines that the frame rate R is at or above the notification threshold Rn in Step 240 and skips Steps 250, 260, and 270. Hence, neither the color border image 91 nor the warning image 92 is superimposed on the frame.

As has been described, the moving image transmitting device 1 of the present embodiment superimposes the animation images on multiple frames forming a moving image according to a video signal outputted from the camera 11 frame by frame while changing the animation images in synchronization with frame advancement. The moving image transmitting device 1 wirelessly transmits the moving image to the moving image receiving device 2 at a predetermined frame rate by transmitting the frames each superimposed with the animation image to the image receiving device 2.

By superimposing the animation images on multiple frames forming a moving image frame by frame while changing the animation images in synchronization with frame advancement in the manner as above, the occupant can determine whether the frames are advancing depending on whether the animation images superimposed on the displayed video are changing. The occupant can thus know a reliability level of the displayed video.

The process that superimposes the animation images on the frames frame by frame while changing the animation images in synchronization with frame advancement as above is performed in a same manner whether the frame rate is below the notification threshold Rn or at or above the notification threshold Rn. The process that superimposes the animation images on the frames frame by frame while changing the animation images in synchronization with frame advancement as above is also performed in a same manner whether the frame rate is below the warning threshold Rw or at or above the warning threshold Rw.

The number of frames displayed per unit period on the display unit 21 decreases not only when the frame rate is lowered as a result of the negotiation, but also when one or more frames are missing.

Even when a video is transferred with a small delay amount as described above, in a case where many devices also use the channel (that is, a frequency band) that the moving image transmitting device 1 and the moving image receiving device 2 are using or the channel is interfered with by a disturbance, missing in communication occurs. That is, even when the moving image transmitting device 1 transmits a frame, the moving image receiving device 2 may fail to receive the frame. Consequently, one or more frames are missing from frames forming the video and a frame rate of the moving image displayed on the display unit 21 decreases substantially.

Even in such cases, because the animation images are superimposed on multiple frames forming the moving image frame by frame while changing the animation images in synchronization with frame advancement, the occupant can determine whether the frames are advancing depending on whether the animation images on the displayed video are changing. The occupant can thus know a reliability level of the displayed video.

In a case where one or more frames are missing, the animation images are changing discontinuously in the moving image displayed on the display unit 21. For example, when a frame superimposed with the animation image 63 is missing and not received, the display unit 21 displays the frame superimposed with the animation image 62 followed by the frame superimposed with the animation image 64.

Second Embodiment

A second embodiment will now be described. A moving image communication system 30 of the present embodiment is different from the moving image communication system 30 of the first embodiment above in that it is not a moving image transmitting device 1 but a moving image receiving device 2 that superimposes an animation image on a frame.

More specifically, a hardware configuration of the moving image communication system 30 of the present embodiment is same as the hardware configuration of the first embodiment above. A signal processing portion 14 in the moving image transmitting device 1 of the present embodiment performs process depicted in FIG. 9 instead of the process depicted in FIG. 2. Likewise, a signal processing portion 24 in the moving image receiving device 2 of the present embodiment performs process depicted in FIG. 10 instead of the process depicted in FIG. 3.

Figure 2:
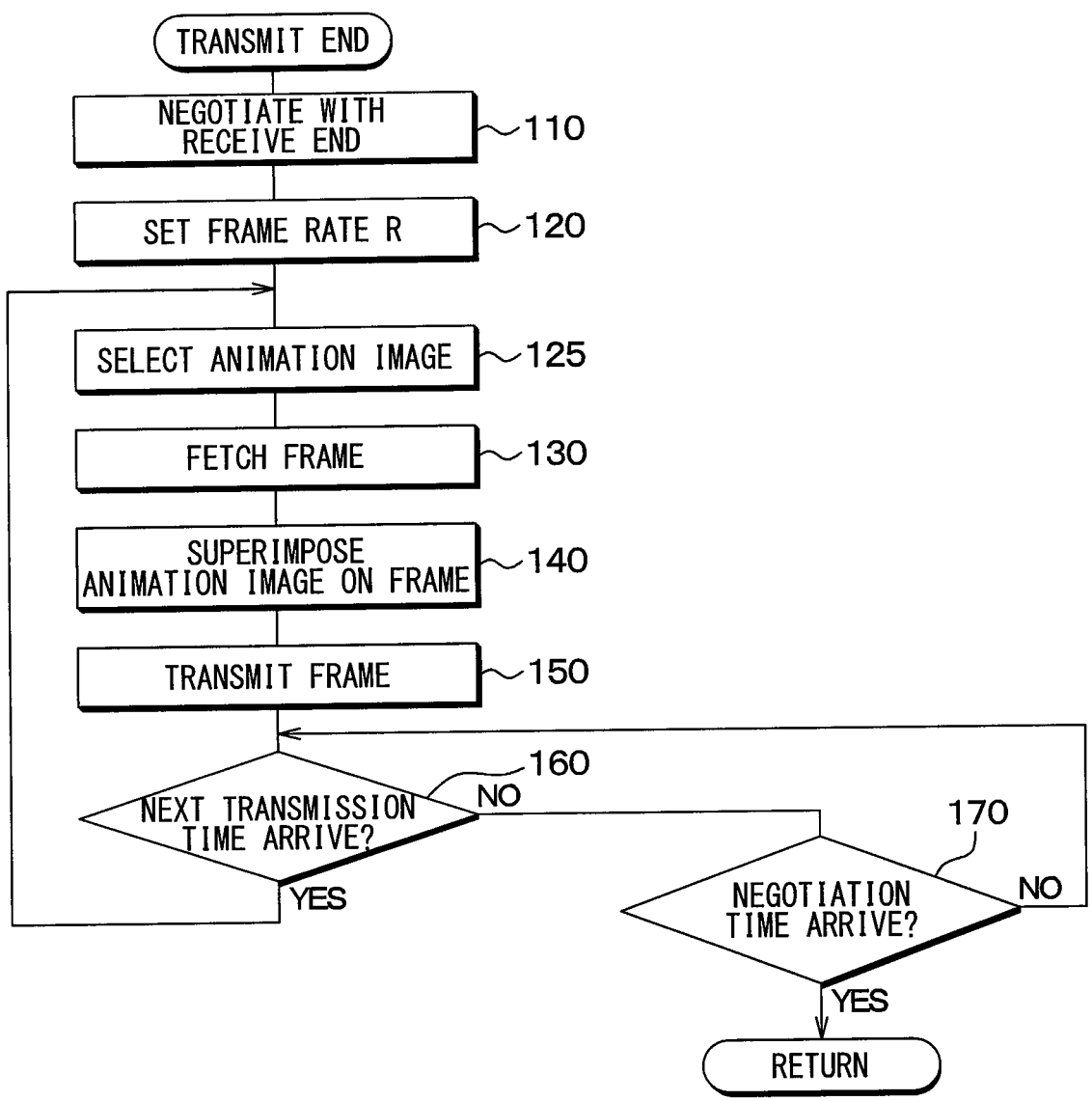
FIG. 2 is a flowchart depicting a process performed by a signal processing portion in a moving image transmitting device.
Figure 3:
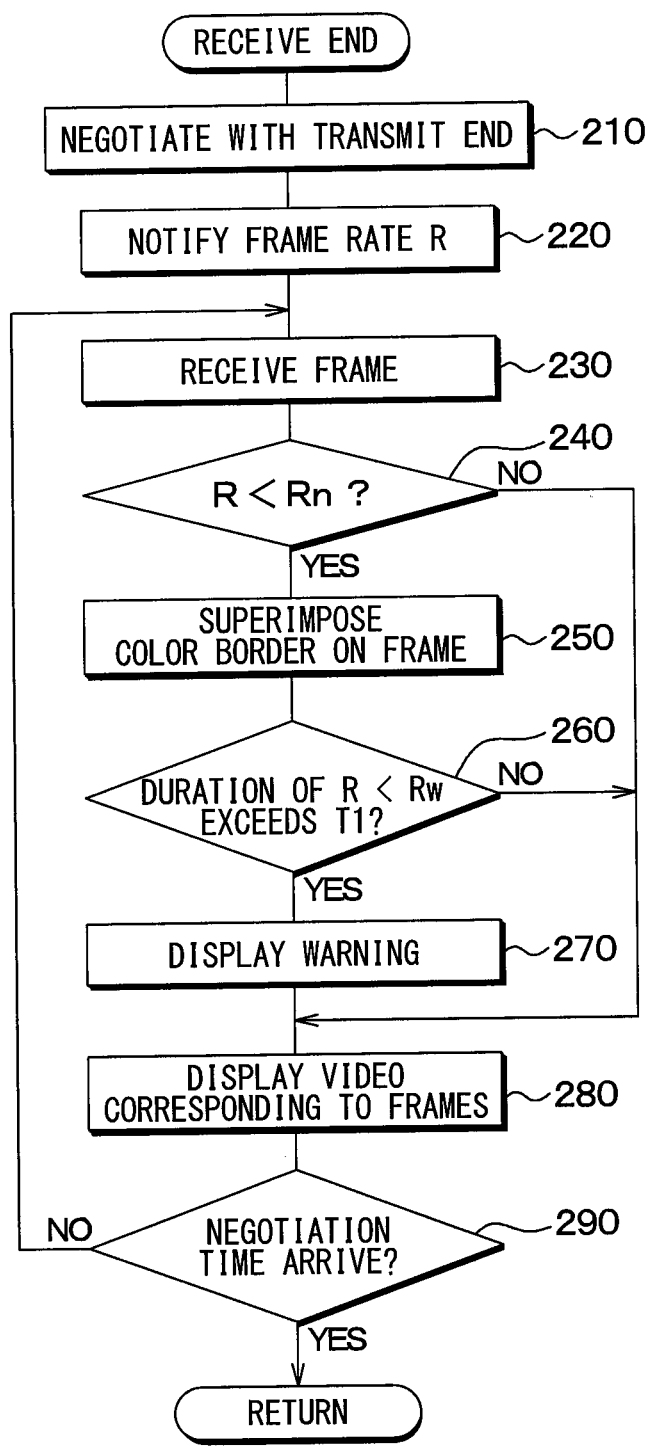
FIG. 3 is a flowchart depicting a process performed by a signal processing portion in a moving image receiving device.
Figure 9:
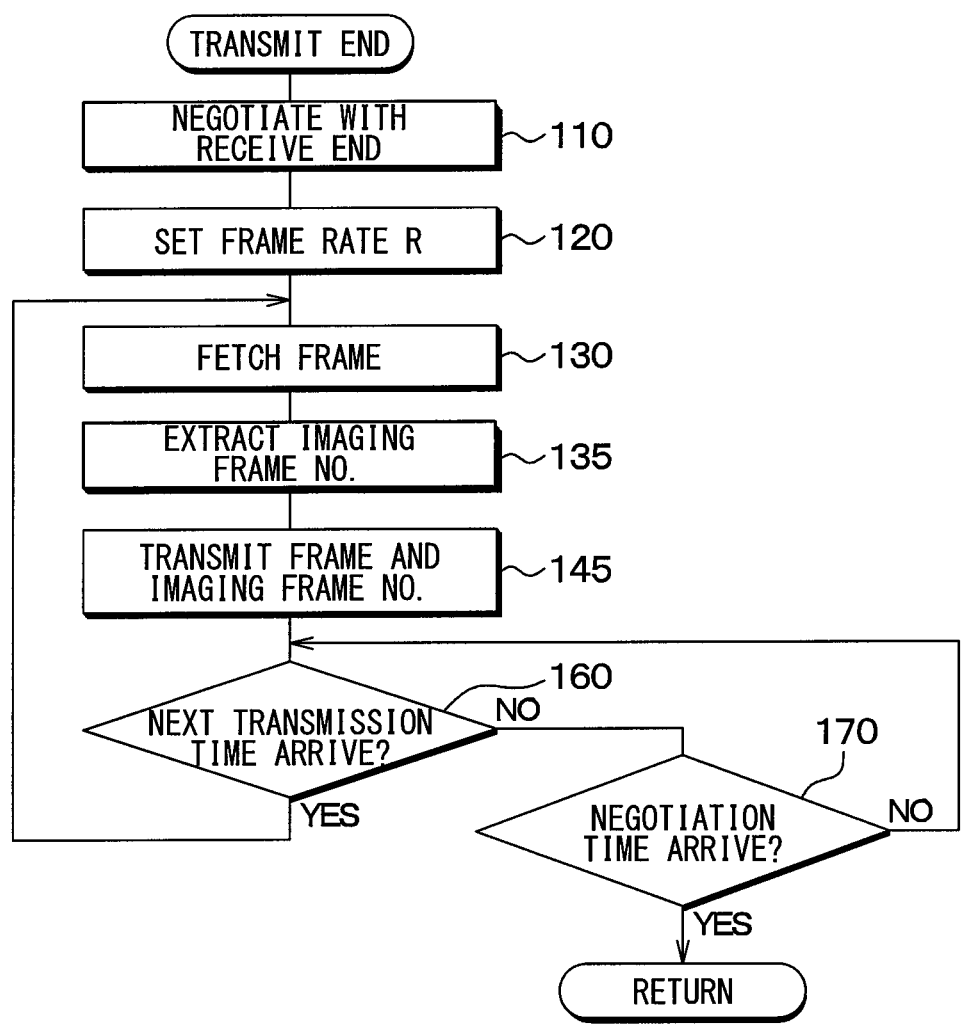
FIG. 9 is a flowchart depicting process performed by a signal processing portion in a moving image transmitting device according to a second embodiment.
Figure 10:
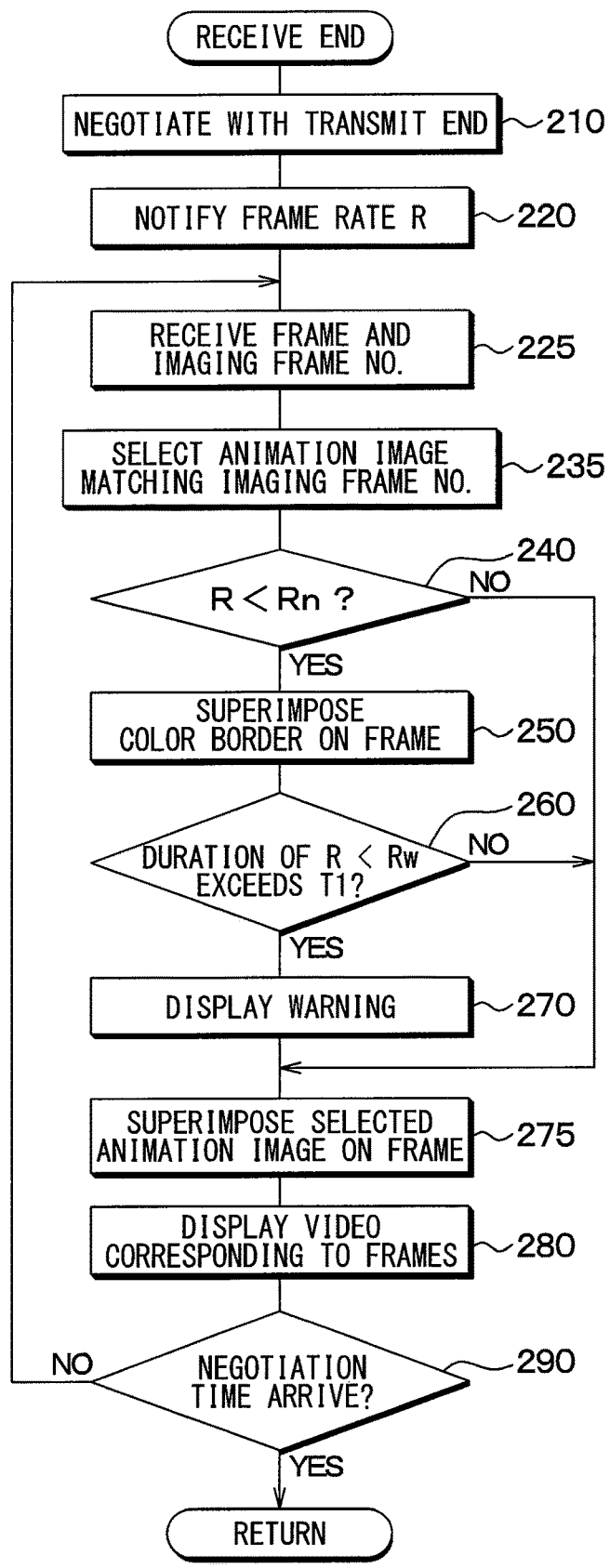
FIG. 10 is a flowchart depicting process performed by a signal processing portion in a moving image receiving device according to the second embodiment.

In FIG. 2 and FIG. 9, steps of same process are labeled with same step numbers and a description of such steps is omitted or given simply in the present embodiment. Likewise, in FIG. 3 and FIG. 10, steps of same process are labeled with same step numbers and a description of such steps is omitted or given simply in the present embodiment.

The following will describe an operation of the moving image communication system 30 of the present embodiment. The signal processing portion 14 and the signal processing portion 24 first negotiate with each other in a known manner in compliance with standards for wireless LAN. More specifically, the signal processing portion 14 negotiates with the signal processing portion 24 in Step 110 of FIG. 9 in a same manner as in the first embodiment above while the signal processing portion 24 negotiates with the signal processing portion 14 in Step 210 of FIG. 10 in the same manner as in the first embodiment above. Accordingly, the signal processing portions 14 and 24 determine a channel and a data transfer rate to be used and communicate with each other via the determined channel at the determined data transfer rate after Steps 110 and 210 as in the first embodiment above.

In subsequent Step 220, the signal processing portion 24 determines a frame rate R and a compression method of a moving image for a moving image so that the moving image is transmitted from the moving image transmitting device at the data transfer rate determined in Step 210 without missing any frame in the same manner as in the first embodiment above. The frame rate R and the compression method thus determined are notified to the moving image transmitting device 1 by transmitting information on the determined frame rate R and the determined compression method to the moving image transmitting device 1 via a wireless module 23.

Meanwhile, the moving image transmitting device 1 receives, at Step 120, the information on the frame rate R and the compression method transmitted from the moving image receiving device 2 in the manner as above via the wireless module 13. The frame rate R and the compression method thus received are set as a frame rate and a compression method to be used in the moving image transmitting device 1. As will be described below, the signal processing portion 14 transmits a moving image to the moving image receiving device 2 by using the frame rate R and the compression method received in Step 120.

The signal processing portion 14 proceeds from Step 120 to Step 130 and fetches one frame according to a video signal outputted from a camera 11. The frame is image data representing a landscape within an imaging range of the camera 11 when the frame is fetched.

In subsequent Step 135, an imaging frame number of the frame fetched in preceding Step 130 is extracted. For example, the imaging frame number increments by one unit each time one frame is fetched. Given 1 as one unit and that the frame fetched in preceding Step 130 is a frame fetched 1000th time after the moving image transmitting device 1 is actuated, then the number 1000 is extracted as the imaging frame number.

In subsequent Step 145, the signal processing portion 14 compresses (that is, encodes) the frame fetched in latest Step 130 by the compression method set in latest Step 120. The signal processing portion 14 correlates the compressed frame with the frame number extracted in preceding Step 135 and sends the both to the moving image receiving device 2 via the wireless module 13.

In subsequent Step 160, the signal processing portion 14 determines whether the next frame transmission time arrives in the same manner as the first embodiment above. When a determination is made that the next frame transmission time has arrived, the signal processing portion 14 returns to Step 130. Otherwise, when a determination is made that the next frame transmission time has not arrived yet, the signal processing portion 14 proceeds to Step 170.

In Step 170, the signal processing portion 14 determines whether the negotiation time has arrived in the same manner as in the first embodiment above. When a determination is made that the negotiation time has not arrived, the signal processing portion 14 returns to Step 160. Otherwise, when a determination is made that the negotiation time has arrived, the signal processing portion 14 returns to Step 110.

In the manner as above, the signal processing portion 14 repeats Steps 160 and 170 unless either the next frame transmission time or the negotiation time comes. When the next frame transmission time comes first, the signal processing portion 14 returns to Step 130 and fetches the following frame. When the negotiation time comes first, the signal processing portion 14 returns to Step 110 and makes a negotiation again.

Accordingly, the signal processing portion 14 in the moving image transmitting device 1 controls the wireless module 13 to transmit frames and correlated imaging frame numbers one by one in time-series order at the pre-set frame rate by performing Steps 130, 135 and 145 each time the frame transmission time comes until the negotiation time comes. All of multiple frames transmitted in the manner as above correspond to one moving image according to a video signal outputted from the camera 11.

Meanwhile, at an end of the moving image receiving device 2, the signal processing portion 24 proceeds from Step 220 to Step 225 and receives a set of the frame and the imaging frame number and decompresses the received frame. More specifically, the signal processing portion 24 waits until one set of the frame and the imaging frame number transmitted from the moving image transmitting device 1 in the manner as above is completely received via the wireless module 23. Upon receipt of one set, the signal processing portion 24 decompresses (that is, decodes) the received frame by a method corresponding to the compression method determined in preceding Step 220 and immediately proceeds to Step 235.

In Step 235, the signal processing portion 24 selects an animation image matching the imaging frame number received in preceding Step 225. As in the first embodiment above, animation images belong to a group of multiple animation images 60 through 66 shown in FIG. 4. In Step 235, one of the animation images 60 through 66 forming a group is extracted in same order as in the first embodiment above to match the imaging frame number received in preceding Step 225. That is, an animation image to be selected is changed in synchronization with increment of the imaging frame numbers, in other words, each time the imaging frame number is incremented by one unit.

Processing contents of subsequent Steps 240, 250, 260, 270, and 280 are same as the processing contents in the first embodiment above except for the following points. The signal processing portion 24 proceeds to Step 275 when it is determined in Step 240 that the frame rate R is at or above a notification threshold Rn. The signal processing portion 24 proceeds to Step 275 when it is determined in Step 260 that a duration of R<Rw does not exceed a reference period T1. The signal processing portion 24 proceeds to Step 275 from Step 270.

In Step 275, the signal processing portion 24 superimposes the animation image selected in Step 235 on the frame received in latest Step 225 by a same method used in Step 140 of the first embodiment above. The frame may be superimposed with a color border image 91 in Step 250 or may be superimposed also with a warning image 92 in Step 270 according to circumstances.

The signal processing portion 24 proceeds from Step 275 to Step 280 and outputs the frame superimposed with the animation image in preceding Step 275 to a display unit 21. The display unit 21 thus displays a video based on the moving image to a driver. The signal processing portion 24 proceeds from Step 280 to Step 290 and determines whether the negotiation time has arrived in the same manner as in the first embodiment above. When a determination is made that the negotiation has not arrived yet, the signal processing portion 24 returns to Step 225. Otherwise, when a determination is made that the negotiation time has arrived, the signal processing portion 24 returns to Step 210.

In the manner as above, the signal processing portion 24 performs Steps 225, 235, 240, 275, and 280 each time a frame is received from the moving image transmitting device 1 until the negotiation time comes. When it is determined that R<Rn, the signal processing portion 24 also performs Steps 250 and 260. Further, when it is determined that the duration of R<Rw exceeds the reference period T1 (the duration while R is smaller than Rw>T1), the signal processing portion 24 also performs Step 270. By repeating the process as above, the signal processing portion 24 receives, in Step 225, a moving image transmitted from the moving image transmitting device 1. The signal processing portion 24 changes the animation images in synchronization with frame advancement in Step 235 and superimposes the animation images on multiple frames forming the received moving image frame by frame in Step 275. The signal processing portion 24 controls the display unit 21 to display a video based on the moving image by outputting the frames superimposed with the animation images to the display unit 21 frame by frame in Step 280.

When the negotiation time comes, the moving image transmitting device 1 and the moving image receiving device 2 operate in a same manner as in the first embodiment above, and a description is omitted herein. Also, as in the first embodiment above, an effect achieved by changing the animation images in synchronization with frame advancement is particularly noticeable in a case where an occupant is not aware of a current frame rate, such as a case where a frame rate is changed when a negotiation is made again.

As has been described, according to the present embodiment, it is not the moving image transmitting device 1 but the signal processing portion 24 in the moving image receiving device 2 that superimposes animation images on frames. Regardless of such a difference, a video displayed on the display unit 21 as an outcome is same as the video displayed in the first embodiment above. Naturally, a video displayed on the display unit 21 in the present embodiment has same characteristics as the characteristics shown in FIG. 8.

Hence, in the present embodiment, too, by superimposing the animation images on multiple frames forming a moving image frame by frame while changing the animation images in synchronization with frame advancement, the occupant can determine whether the frames are advancing depending on whether the animation images on the displayed video are changing. The occupant can thus know a reliability level of the displayed video. In addition, by superimposing the color border image 91 and the warning image 92 on the frames, effects same as the effects achieved in the first embodiment above can be also obtained.

Even in a case where the frame rate R is below the warning threshold Rw, the signal processing portion 24 skips Step 270 when the duration of R<Rw is shorter than the reference period T1. Hence, in such a case, the frame is not superimposed with the warning image and superimposed only with the animation image and the color border image. Owing to the configuration as above, even when the frame rate R drops below the warning threshold Rw, the driver can know that the frame rate is decreasing from the animation images and the color border image in a delay time before the warning image is displayed.

The process that superimposes the animation images on the frames while changing the animation images in synchronization with frame advancement is performed by the signal processing portion 24 in a same manner whether the frame rate is below the notification threshold Rn or at or above the notification threshold Rn. The process that superimposes the animation image on the frame while changing the animation images in synchronization with frame advancement as above is also performed in a same manner whether the frame rate is below the warning threshold Rw or at or above the warning threshold Rw.

In the present embodiment, too, the number of frames displayed per unit period on the display unit 21 decreases not only when the frame rate is lowered as a result of the negotiation, but also when one or more frames are missing as in the first embodiment above.

Even in such a case, because the animation images are superimposed on multiple frames forming the moving image frame by frame while changing the animation images in synchronization with frame advancement, the occupant can determine whether the frames are advancing depending on whether the animation images on the displayed video are changing. The occupant can thus know a reliability level of the displayed video.

In a case where one or more frames are missing, the animation images are changing discontinuously in the moving image displayed on the display unit 21 in the present embodiment, too. Such discontinuously changing animation images are attributed to the configuration of the present embodiment that the signal processing portion 24 receives the frame number from the signal processing portion 14 and the signal processing portion 24 changes the animation images in synchronization with increment of the frame number.

Other Embodiments

It should be appreciated that the present disclosure is not limited to the embodiments described above and can be modified in various manners. The respective embodiments above are not irrelevant to each other and can be combined as needed unless such a combination is obviously infeasible. It goes without saying that elements forming the embodiments above are not necessarily essential in the respective embodiments above unless specified otherwise or apparently deemed as being essential in principle. Numerical values of the elements forming the embodiments above, such as the numbers, values, amounts, and ranges, are not limited to particular numerical values referred to in the respective embodiments above unless specified otherwise or deemed as being limited to the particular numerical values in principle. Shapes and positional relationships of the elements forming the respective embodiments are not limited to the shapes and the positional relationships referred to in the respective embodiments above unless specified otherwise or deemed as being limited to the specified shapes and positional relationships in principle. The present disclosure also includes modifications of the respective embodiments above as described below. Whether respective modifications described below are applicable to the embodiments above may be determined individually. That is, any combination of the following modifications may be applied to the embodiments above.

(First Modification)

In the first embodiment above, process to or not to superimpose the color border image 91 on a frame is performed by the signal processing portion 24 in the moving image receiving device 2 by comparing the frame rate R and the notification threshold Rn. Alternatively this process may be performed by the signal processing portion 14 in the moving image transmitting device 1 instead of the signal processing portion 24 in the moving image receiving device 2.

Figure 11:
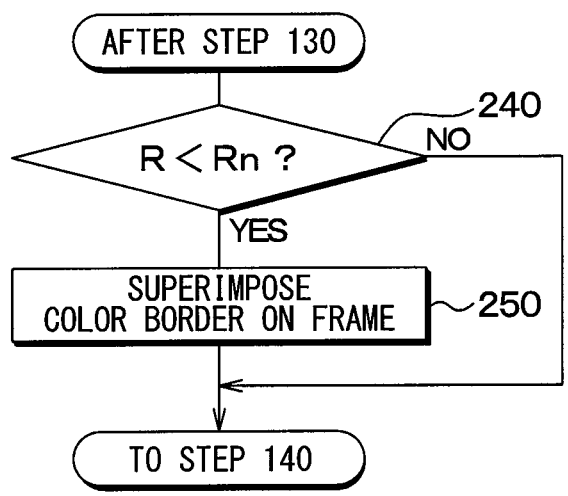
FIG. 11 is a flowchart according to a modification of the first embodiment.

To realize the first modification, the first embodiment above is modified as follows. That is, the signal processing portion 24 in the moving image receiving device 2 performs Step 260 immediately after Step 230 by skipping Steps 240 and 250. Also, as is depicted in FIG. 11, the signal processing portion 14 in the moving image transmitting device 1 performs process in Steps 240 and 250 of FIG. 3 between Step 130 and Step 140 of FIG. 2. To be more specific, the signal processing portion 14 performs Step 240 after Step 130 and performs Step 250 when it is determined in Step 240 that the frame rate R is below the notification threshold Rn. When it is determined that the frame rate R is at or above the notification threshold Rn, the signal processing portion 14 proceeds to Step 140 by skipping Step 250. When it is determined that the frame rate R is lower than the notification threshold Rn, the signal processing portion 14 proceeds to Step 140 after superimposing color border image 91 on the frame in Step 250.

(Second Modification)

In the second embodiment above, process to or not to superimpose the color border image 91 on a frame is performed by the signal processing portion 24 in the moving image receiving device 2 by comparing the frame rate R and the notification threshold Rn. Alternatively, such process may be performed by the signal processing unit 14 in the moving image transmitting device 1 instead of the signal processing portion 24 in the moving image receiving device 2.

Figure 12:
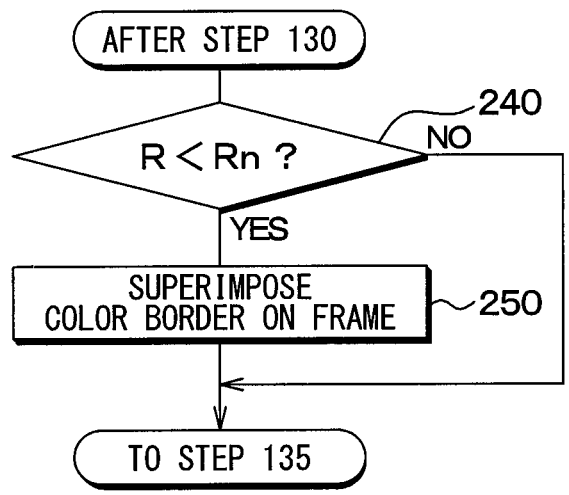
FIG. 12 is a flowchart according to a modification of the second embodiment.

To realize the second modification, the second embodiment above is modified as follows. That is, the signal processing portion 24 in the moving image receiving device 2 performs Step 260 immediately after Step 235 by skipping Steps 240 and 250. Also, as is depicted in FIG. 12, the signal processing portion 14 in the moving image transmitting device 1 performs process in Steps 240 and 250 of FIG. 10 between Step 130 and Step 135 of FIG. 9. To be more specific, the signal processing portion 14 performs Step 240 after Step 130 and performs Step 250 when it is determined in Step 240 that the frame rate R is below the notification threshold Rn. When it is determined that the frame rate R is at or above the notification threshold Rn, the signal processing portion 14 proceeds to Step 135 by skipping Step 250. When it is determined that the frame rate R is lower than the notification threshold Rn, the signal processing portion 14 proceeds to Step 135 after superimposing the color border image 91 on the frame in Step 250.

(Third Modification)

In the embodiments above, the signal processing portion 24 adopts the frame rate determined in latest Step 220 as the frame rate R to be compared with the notification threshold Rn and the warning threshold Rw in Steps S240 and 260, respectively. The present disclosure is not limited to the configuration as above. For example, an actual reception rate of frames may be calculated according to reception time points of frames in latest Step 225 and second latest Step 225 or more than one previous Step 225. The reception rate is an index indicating how many frames are received per second. The signal processing portion 24 may use the calculated reception rate as the frame rate R, and compare the calculated reception rate with the notification threshold Rn and the warning threshold Rw in Steps 240 and 260, respectively.

(Fourth Modification)

In the first and second embodiments above, a frame rate of a moving image transmitted from the moving image transmitting device 1 to the moving image receiving device 2 is changed in each negotiation. An operation to superimpose animation images on multiple frames frame by frame while changing the animation images in synchronization with frame advancement can provide a certain effect even when a moving image is transmitted from the moving image transmitting device 1 to the moving image receiving device 2 at a fixed frame rate.

In a moving image communication system using a fixed frame rate, when a real view within the imaging range of a moving image transmitting device over a certain period remains unchanged, display contents of respective frames forming a moving image during the certain period displayed to the occupant remains unchanged, too. Even when a real view within the imaging range of the moving image transmitting device over the certain period is changing, the moving image may include only one frame corresponding to a video during the certain period depending on a frame rate at which the moving image is transmitted.

In such a case, the occupant cannot determine whether a view within the imaging range outside the vehicle is not changing really or a view outside the vehicle is actually changing but a frame rate of the moving image is so low that only the same frame is displayed during the certain period unless the animation images are superimposed on the frames. The moving image communication system using a fixed frame rate therefore has a problem that the occupant has no idea how exactly the occupant understands a situation outside the vehicle by looking at a video based on the moving image.

To eliminate such a problem, by superimposing the animation images on multiple frames forming a moving image frame by frame while changing the animation images in synchronization with frame advancement, the occupant can know whether the frames are advancing depending on whether the animation images on the displayed video are changing. The occupant can thus know a reliability level of the displayed video.

(Fifth Modification)

In the embodiments above, animation images of a swinging pendulum are shown as an example of animation images. When such animation images are displayed one after another in time-series order, an individual can acknowledge that an object is in motion. Animation images with such characteristics (animation images in smooth motion) other than animation images of a swinging pendulum may be used as well. For example, animation images of a sweep bar, a timepiece, or the like may be used instead.

(Sixth Modification)

In the embodiments above, the color border image 91 has been described as an example of the notification image superimposed on the frame when the frame rate R drops below the notification threshold Rn. The notification image may be any display accounting for a smaller proportion of pixels forming the entire frame than the warning image 92 and displayed in a range farther from the center of the screen on the display unit 21 than the display range of the warning image 92. For example, characters may be replaced with the color border image 91 of FIG. 6 and superimposed in a region where the color border image 91 is supposed to be superimposed.

(Seventh Modification)

In the first and second embodiments above, the signal processing portion 24 may not perform process in Steps 240 and 250. In such a case, the first embodiment above is modified in such a manner that the signal processing portion 24 performs Step 260 after Step 230 of FIG. 3 by skipping Steps 240 and 250. The second embodiment is modified in such a manner that the signal processing portion 24 performs Step 260 after Step 235 of FIG. 10 by skipping Steps 240 and 250.

(Eighth Modification)

In the first and second embodiments above, the signal processing portion 24 may not perform process in Steps 260 and 270. In such a case, the first embodiment above is modified in such a manner that the signal processing portion 24 performs Step 280 after Step 250 of FIG. 3 by skipping Steps 260 and 270. The second embodiment is modified in such a manner that the signal processing portion 24 performs Step 275 after Step 250 of FIG. 10 by skipping Steps 260 and 270.

What is claimed is:

1. A moving image transmitting device for use in a vehicle, the moving image transmitting device comprising:
   a camera configured to output a video signal corresponding to a video of a subject existing outside the vehicle;
   a signal processor configured to superimpose animation images on a plurality of frames, frame by frame, while changing the animation images in synchronization with a frame advancement, and the plurality of frames forming a moving image corresponding to the video signal output from the camera; and
   a wireless communication interface configured to wirelessly transmit, to a moving image display device at a frame rate that is preliminarily determined, the moving image that is formed of the plurality of frames superimposed with the animation images by the signal processor, the moving image display device configured to receive the moving image and to display the received moving image to an occupant of the vehicle, wherein the moving image display device is further configured to display a superimposed warning image on the received moving image to the occupant when the frame rate of the received moving image remains below a predetermined warning threshold for a period longer than a reference period; and wherein the signal processor is further configured to superimpose the animation images on the plurality of frames that form the moving image corresponding to the video signal output from the camera, frame by frame, while changing the animation images in synchronization with the frame advancement, when the frame rate of the moving image to be transmitted is below the predetermined warning threshold and the frame rate of the moving image remains below the predetermined warning threshold for a period equal to or shorter than the reference period; and wherein in response to the warning image being displayed, the warning image uses a larger amount of pixels for display than an amount of pixels used for displaying the animation images.

2. The moving image transmitting device according to claim 1, wherein the signal processor is further configured to change the frame rate.

3. The moving image transmitting device according to claim 1, wherein the moving image display device is further configured to display the warning image in a transparent blue color or an opaque blue color.

4. The moving image transmitting device according to claim 1, wherein the moving image display device is further configured to display a text indicating a low frame rate as the warning image.

5. The moving image transmitting device according to claim 1, wherein in response to the frame rate of the received moving image falling below a predetermined notification threshold, the moving image display device is further configured to display a superimposed notification image on the received moving image, and wherein in response to the frame rate of the received moving image falling and remaining below the predetermined warning threshold for the period longer than the reference period, the moving image display device is further configured to display the superimposed notification image and the superimposed warning image on the received moving image, and wherein a frame rate of the predetermined notification threshold is higher than a frame rate of the predetermined warning threshold, and wherein the moving image display device is further configured to display the superimposed warning image toward a center of the received moving image and to display the superimposed notification image around a border of the received moving image.

6. The moving image transmitting device according to claim 1, wherein the signal processor is further configured to change the animation images during the frame advancement and to change an orientation of the animation images as each frame advances to a successive frame.

7. A moving image display device for use in a vehicle, the moving image display device comprising:

a wireless communication interface configured to receive a moving image corresponding to a video of a subject existing outside the vehicle, the moving image being wirelessly transmitted from a moving image transmitting device at a frame rate that is preliminarily determined;

a display unit configured to display a video corresponding to the moving image to an occupant of the vehicle; and a signal processor configured to control the display unit to display the video corresponding to the moving image received by the wireless communication interface, wherein the signal processor is further configured to superimpose animation images on a plurality of frames forming the moving image, frame by frame, while changing the animation images in synchronization with a frame advancement and outputs the plurality of frames superimposed with the animation images to the display unit, wherein the signal processor is further configured to display a superimposed warning image on the video corresponding to the moving image when the frame rate is below a predetermined warning threshold and the frame rate remains below the predetermined warning threshold for a period longer than a reference period; and wherein the signal processor is further configured to superimpose the animation images on the plurality of frames that form the moving image corresponding to the video of the subject captured by a camera, frame by frame, while changing the animation images in synchronization with the frame advancement without controlling the display unit to display the warning image when the frame rate is below a predetermined notification threshold and the predetermined warning threshold and the frame rate remains below the predetermined warning threshold for a period equal to or shorter than the reference period; and wherein in response to the warning image being displayed, the display unit is further configured to display the warning image using a larger amount of pixels than an amount of pixels used for displaying the animation images.

8. The moving image display device according to claim 7, wherein:

the signal processor is further configured to superimpose a notification image on each of the plurality of frames forming the moving image when the frame rate is below the predetermined notification threshold.

9. The moving image display device according to claim 7, wherein the display unit is further configured to display the warning image in a transparent blue color or an opaque blue color.

10. The moving image display device according to claim 7, wherein the display unit is further configured to display a text indicating a low frame rate as the warning image.

11. The moving image display device according to claim 7, wherein in response to the frame rate falling below the predetermined notification threshold, the display unit is further configured to display a superimposed notification image on the video corresponding to the moving image, and wherein in response to the frame rate falling and remaining below the predetermined warning threshold for the period longer than the reference period, the display unit is further configured to display the superimposed notification image and the superimposed warning image on the video corresponding to the moving image, and wherein a frame rate of the predetermined notification threshold is higher than a frame rate of the predetermined warning threshold, and wherein the display unit is further configured to display the superimposed warning image toward a center of the video corresponding to the moving image and to display the superimposed notification image around a border of the video corresponding to the moving image.

12. A moving image communication system for use in a vehicle, the moving image communication system comprising:

a moving image transmitting device configured to superimpose animation images on a plurality of frames that form a moving image corresponding to a video of a subject existing outside the vehicle, frame by frame, while changing the animation images in synchronization with a frame advancement, and to wirelessly transmit the plurality of frames superimposed with the animation images at a predetermined frame rate; and a moving image display device configured to receive the moving image transmitted from the moving image transmitting device and to display a video corresponding to the received moving image to an occupant of the vehicle, wherein the moving image display device is further configured to display a superimposed warning image to the occupant when the frame rate of the received moving image remains below a predetermined warning threshold for a period longer than a reference period; and wherein a signal processor of the moving image transmitting device is configured to superimpose the animation images on the plurality of frames that form the moving image corresponding to the video signal output from the camera, frame by frame, while changing the animation images in synchronization with the frame advancement when the frame rate of the moving image to be transmitted is below the predetermined warning threshold and the frame rate of the moving image remains below the predetermined warning threshold for a period equal to or shorter than the reference period; and wherein in response to the warning image being displayed, the moving image display device is further configured to use a larger amount of pixels to display the warning image than an amount pixels used for displaying the animation images.

13. The moving image communication system according to claim 12, wherein the moving image display device is further configured to display the warning image in a transparent blue color or an opaque blue color.

14. The moving image communication system according to claim 12, wherein the moving image display device is further configured to display a text indicating a low frame rate as the warning image.

15. The moving image communication system according to claim 12, wherein in response to the frame rate of the received moving image falling below a predetermined notification threshold, the moving image display device is further configured to display a superimposed notification image on the video corresponding to the received moving image, and wherein in response to the frame rate of the received moving image falling and remaining below the predetermined warning threshold for the period longer than the reference period, the moving image display device is further configured to display the superimposed notification image and the superimposed warning image on the video corresponding to the received moving image, and wherein a frame rate of the predetermined notification threshold is higher than a frame rate of the predetermined warning threshold, and wherein the moving image display device is further configured to display the superimposed warning image toward the center of the video corresponding to the moving image and to display the superimposed notification image around a border of the video corresponding to the moving image.

16. The moving image communication system according to claim 12, wherein the signal processor is further configured to change the animation images during the frame advancement and to change an orientation of the animation images as each frame advances to a successive frame.

17. A moving image communication system for use in a vehicle, the moving image communication system comprising:

a moving image transmitting device configured to wirelessly transmit a moving image corresponding to a video of a subject existing outside the vehicle at a predetermined frame rate; and a moving image display device configured to receive the moving image transmitted from the moving image transmitting device, wherein the moving image display device is further configured to superimpose animation images on a plurality of frames forming the moving image, frame by frame, while changing the animation images in synchronization with a frame advancement, and to display a video corresponding to the moving image formed of the plurality of frames superimposed with the animation images to an occupant of the vehicle, wherein a signal processor of the moving image display device is configured to control the moving image display device to display a superimposed warning image when the frame rate is below a predetermined warning threshold and the frame rate remains below the predetermined warning threshold for a period longer than a reference period; and wherein the signal processor is further configured to superimpose the animation images on the plurality of frames that form the moving image corresponding to the video of the subject captured by a camera, frame by frame, while changing the animation images in synchronization with the frame advancement without controlling the moving image display device to display the warning image when the frame rate is below the predetermined warning threshold and the frame rate remains below the predetermined warning threshold for a period equal to or shorter than the reference period; and wherein in response to the warning image being displayed, the moving image display device is further configured to use a larger amount of pixels to display the warning image than an amount pixels used for displaying the animation images.

18. The moving image communication system according to claim 17, wherein
the moving image display device is further configured to display the warning image in a transparent blue color or an opaque blue color.

19. The moving image communication system according to claim 17, wherein
the moving image display device is further configured to display a text indicating a low frame rate as the warning image.

20. The moving image communication system according to claim 17, wherein
in response to the frame rate falling below a predetermined notification threshold, the moving image display device is further configured to display a superimposed notification image on the video corresponding to the moving image, and wherein
in response to the frame rate falling and remaining below the predetermined warning threshold for the period longer than the reference period, the moving image display device is further configured to display the superimposed notification image and the superimposed warning image on the video corresponding to the moving image, and wherein
a frame rate of the predetermined notification threshold is higher than a frame rate of the predetermined warning threshold, and wherein
the moving image display device is further configured to display the superimposed warning image toward a center of the video corresponding to the moving image and to display the superimposed notification image around a border of the video corresponding to the moving image.

* * * * *